US005775563A

United States Patent [19]

Kojima

[11] Patent Number: 5,775,563
[45] Date of Patent: Jul. 7, 1998

[54] LEADER TRANSPORT APPARATUS IN AUTOMATIC FILM PROCESSING APPARATUS

[75] Inventor: Masayuki Kojima, Wakayama, Japan

[73] Assignee: Noritsu Koki Co., Ltd., Wakayama-ken, Japan

[21] Appl. No.: 803,348

[22] Filed: Feb. 20, 1997

[30] Foreign Application Priority Data

Feb. 28, 1996 [JP] Japan .................................... 8-041560

[51] Int. Cl.$^6$ .............................. G03B 1/56; B65H 20/00

[52] U.S. Cl. ............................... 226/92; 226/90; 226/171

[58] Field of Search ................................ 226/89, 90, 91, 226/92, 171

[56] References Cited

U.S. PATENT DOCUMENTS

| | | | |
|---|---|---|---|
| 3,562,495 | 2/1971 | Grippi, Jr. | 226/90 X |
| 3,576,283 | 4/1971 | MacDonald, Jr. | 226/90 |
| 3,661,067 | 5/1972 | Aarnio . | |
| 4,052,921 | 10/1977 | Sethi et al. . | |
| 4,091,649 | 5/1978 | Johnson | 226/91 X |
| 4,860,044 | 8/1989 | Kanai et al. | 226/92 X |
| 5,234,532 | 8/1993 | Tomikura et al. | 226/91 X |

FOREIGN PATENT DOCUMENTS 556 789 12/1974 Switzerland .

*Primary Examiner*—Michael Mansen
*Attorney, Agent, or Firm*—Frishauf, Holtz, Goodman, Langer & Chick

[57] ABSTRACT

A leader transport apparatus in a automatic film processing apparatus includes a fixed base having transporting rollers, a movable base having transporting rollers and a driving unit for driving the transporting rollers. The fixed base and the movable base are so disposed that the transporting rollers of the fixed base can each confront the transporting rollers of the movable base, and the driving unit is adapted to drive the transporting rollers of at least one of the fixed base and the movable base so that a leader and an undeveloped film can be transported with sandwiched between the transporting rollers of the fixed base and the transporting rollers of the movable base, the movable base being supported at one end thereof by a hinge so that it can be opened and closed arbitrarily.

8 Claims, 4 Drawing Sheets

LEADER TRANSPORT APPARATUS IN AUTOMATIC FILM PROCESSING APPARATUS

BACKGROUND OF THE INVENTION

The present invention relates to a leader transport apparatus for transporting a leader connected to an undeveloped film into an automatic film processing apparatus, when the undeveloped film is processed in the automatic film processing apparatus.

In general, when an undeveloped film is processed in the automatic film processing apparatus, a leader is connected to a foremost end of the undeveloped film, before the undeveloped film is fed into a film insertion slot which communicates with processing solution tanks in the automatic film processing apparatus, so that the leader can lead the undeveloped film to the film insertion slot and thus into the developing solution tanks in the automatic film processing apparatus.

However, when the transport of the leader is stopped by a breakdown of the automatic film processing apparatus or some other cause, the automatic film processing apparatus of this general type often has structural difficulties in pulling back the leader stopped in the automatic film processing apparatus to take it out. In this circumstance, the prior art makes it a common practice to move forward the leader stopped in the automatic film processing apparatus manually to pass various kinds of processing solution tanks arranged in the automatic film processing apparatus and thereafter take it out from a discharge slot.

Thus, this conventional type automatic film processing apparatus has a disadvantage in that once the automatic film processing apparatus is stopped by a breakdown, a power failure or the like, the leader and undeveloped film stopped in the automatic film processing apparatus must be taken out at much expense in time and effort, thus substantially affecting the sequential processing of the undeveloped film. This causes a significant disadvantage to the realization of an efficient film processing.

SUMMARY OF THE INVENTION

To eliminate or minimize the above described disadvantages, the present invention has been made. It is the object of the invention to provide a leader transport apparatus in the automatic film processing apparatus which can provide the following results:

1) that when the automatic film processing apparatus is stopped by a breakdown or the power failure in the middle of transport of the undeveloped film with the leader and the undeveloped film connected to the leader being at a position upstream from the developing solution tanks in the automatic film processing apparatus, the film can be pulled back to be easily removed from a transporting path and easily reset in the transporting path, and 2) when the leader and the undeveloped film are poorly connected, the transport of the leader and the undeveloped film can be stopped to remove the leader and the undeveloped film from the transporting path before they are transported to the developing solution tanks in the automatic film processing apparatus.

To achieve the above described objects of the invention effectively, the leader transport apparatus in the automatic film processing apparatus according to the present invention comprises:

a fixed base having transporting rollers, a movable base having transporting rollers and being supported at one end thereof by a hinge so that it can be opened and closed arbitrarily, the fixed base and the movable base being so disposed that the transporting rollers of the fixed base can each confront the transporting rollers of the movable base, and a driving unit to drive the transporting rollers of at least one of the fixed base and the movable base so that a leader and an undeveloped film can be transported with sandwiched between the transporting rollers of the fixed base and the transporting rollers of the movable base.

Alternatively, the leader transport apparatus in the automatic film processing apparatus according to the present invention may comprise:

a pair of movable bases each having transporting rollers, the pair of movable bases being disposed so that the transporting rollers of one of the pair of movable bases can each confront the transporting rollers of the other of the pair of movable bases and each of the movable bases being so supported at one end thereof by a hinge as to be opened and closed arbitrarily, and a driving unit to drive the transporting rollers of at least one of the pair of movable bases so that a leader and an undeveloped film can be transported with sandwiched between the transporting rollers of the pair of movable bases.

DETAILED DESCRIPTION OF THE PREFERRED EMBODIMENT

Referring now to the accompanying drawing figures, an example of the preferred embodiment of the invention is described below. It is to be understood, however, that the scope of the invention is by no means limited to the illustrated embodiment.

Figure 1:
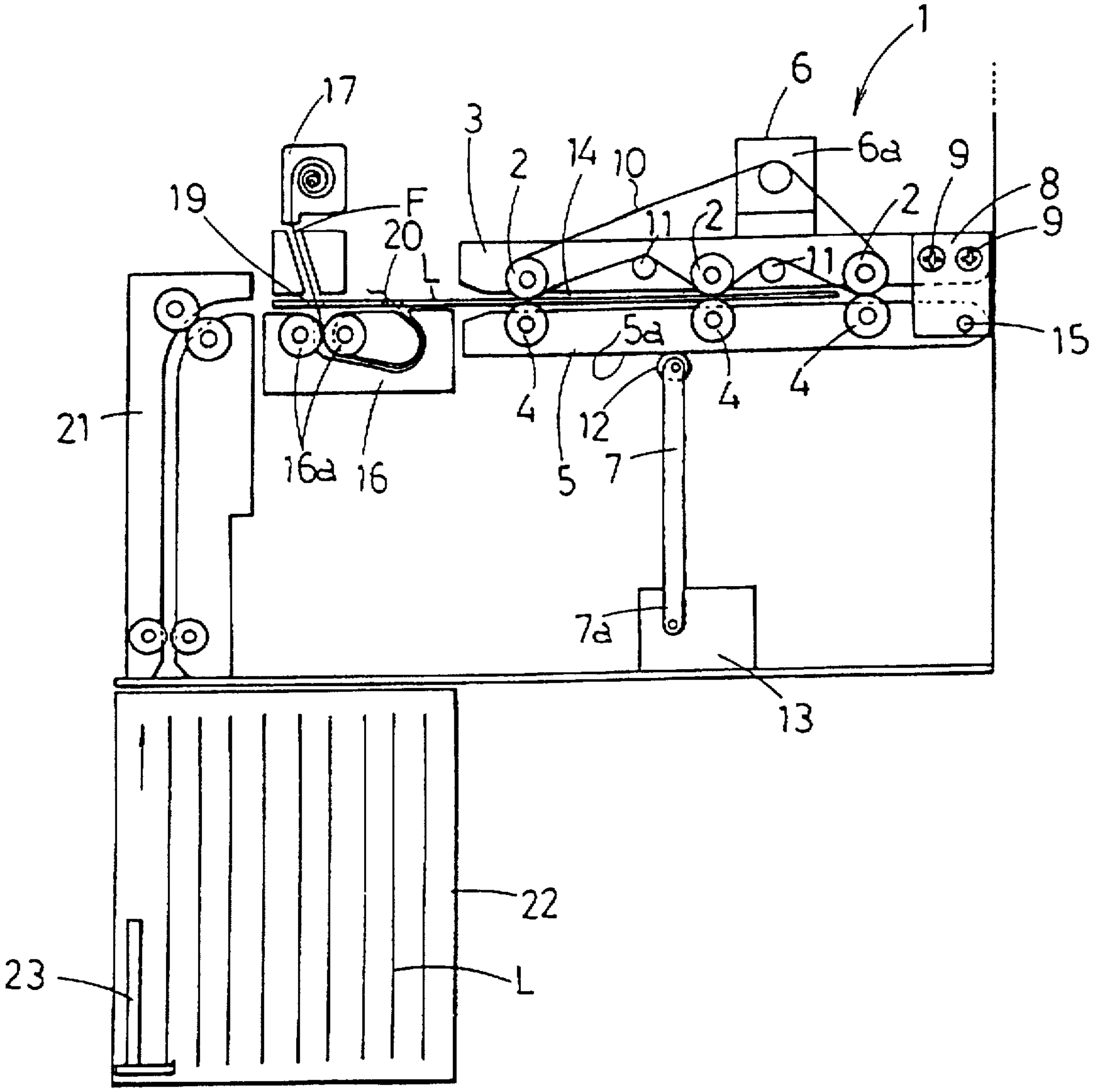
FIG. 1 diagrammatically illustrates the leader transport apparatus according to the invention.

A leader transport apparatus 1 in an automatic film processing apparatus according to the invention shown in FIG. 1 is disposed at a position upstream from developing solution tanks (not shown) in the automatic film processing apparatus.

The leader transport apparatus 1 comprises a fixed base 3 having a plurality of transporting rollers 2, a movable base 5 having a plurality of transporting rollers 4 and being capable of being opened and closed, a driving unit 6 for driving the transporting rollers 2, and a support member 7 for supporting the movable base 5.

The fixed base 3 is an elongated member, one end of which is fixed to a support frame 8 with screws 9 to be held in the horizontal position. The fixed base 3 is provided with the transporting rollers 2 which are rotatably mounted to one lengthwise side of the fixed base 3 at adequate intervals.

The transporting rollers 2 mounted on the fixed base 3 are adapted to rotate simultaneously in the same direction by the driving unit 6. The driving unit 6 includes a drive motor 6a, a drive chain 10, a plurality of tension rollers 11, and other gears (not shown) or reduction gears (not shown). The drive chain 10 runs over the transporting rollers 2 and tension rollers 11, in a tensed state, as illustrated.

The movable base 5 is disposed along the fixed base 3 constructed as mentioned above. In detail, the movable base 5 is also an elongated member having the same form as the fixed base 3 and is connected at its one end to the support frame 8 with a hinge 15, so that it is supported to be freely opened and closed. Also, the movable base 5 is provided, at its one lengthwise side near the fixed base 3, with the transporting rollers 4 which are freely rotatable and which are arranged so as to confront the transporting rollers 2 of the fixed base 3. When the movable base 5 is adjoined the fixed base 3 along the longitudinal direction thereof in order to transport the leader L or when the movable base 5 is closed, the transporting rollers 2 of the fixed roller 3 and the transporting rollers 4 of the movable base 5 come into contact with or confront each other at a very small interval. Each of the transporting rollers 2, 4 is made of an elastic material. Further, the fixed base 3 and the movable base 5 are provided, at their left end portions near the transporting path 14 as viewed in the figure, with sensors (not shown), respectively, by which the connection of the leader L and the undeveloped film F is detected.

Figure 2:
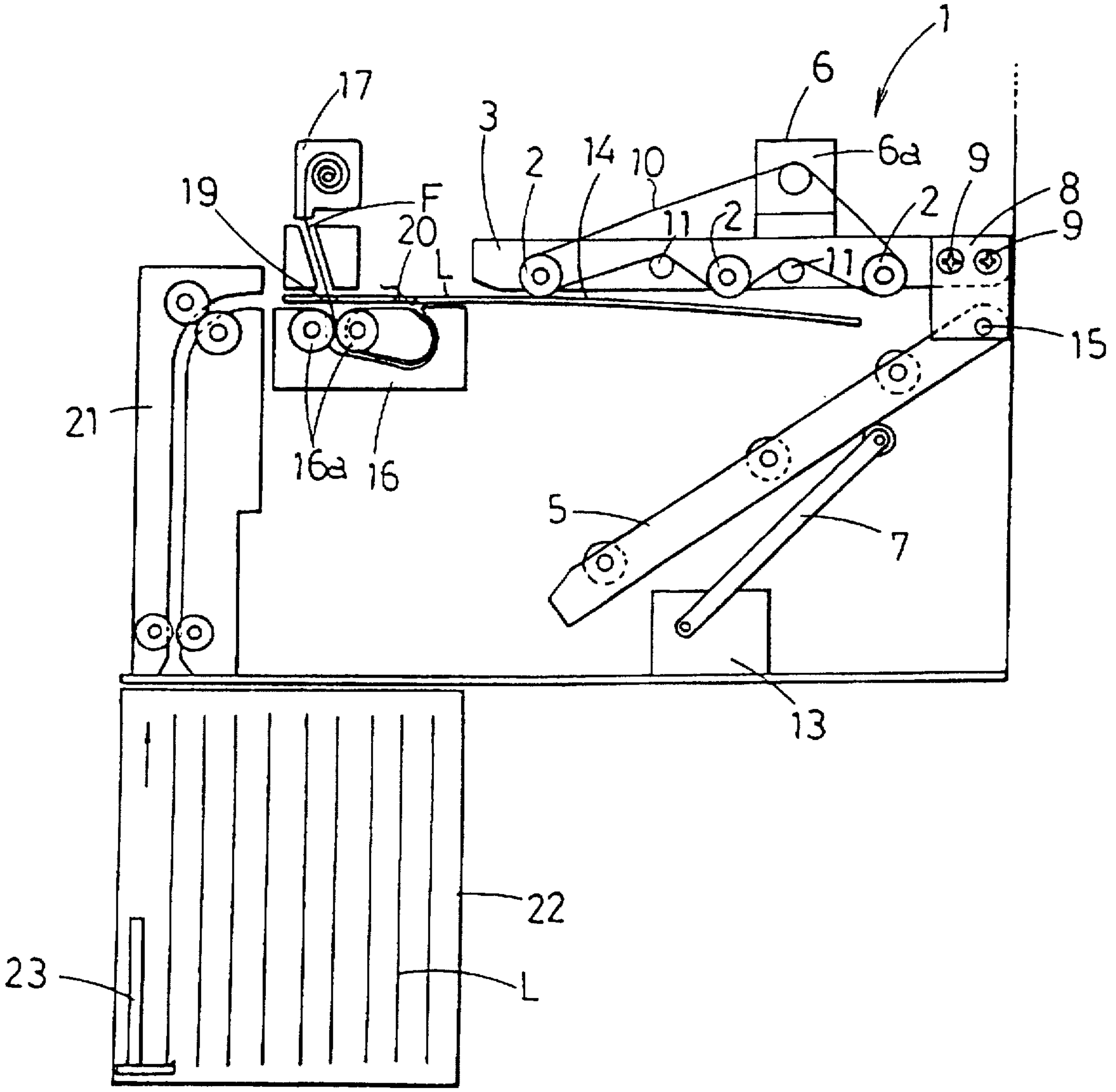
FIG. 2 illustrates the leader transport apparatus of FIG. 1 with the movable base opened.

The movable base 5 is supported by the support member 7. The support member 7 is provided at its upper end with a freely rotatable roller 12, which is adapted to rotate in contact with a bottom surface 5*a* of the movable base 5. When the support member 7 is in its upright position supporting the movable base 5 (see FIG. 1), the roller 12 is in engagement to a recessed portion formed on the bottom surface 5*a* of the movable base 5. A lower end 7*a* of the support member 7 is pivotably mounted on a fixing member 13. By tilting the support member 7 as shown in FIG. 2, the movable base 5 held in its horizontal position is tilted downward with pivoting on the hinge 15, so that it is moved away from the fixed base 3 to open the transporting path 14 of the leader L and the undeveloped film F to the outside. In the fixing member 13, a cutout having an inclined end is formed (at the back of the fixing member as viewed in the figure, not shown) so that the support member 7 can be held in its tilted position (see FIG. 2). The cutout allows the support member 7 to be tilted from its upright position (see FIG. 1) to its tilted position as shown in FIG. 2 within the limited range of the cutout. At its tilted position, the support member 7 is brought into contact with the inclined end of the cutout in the fixing member 13 to be prevented from being tilted further.

The leader transport apparatus 1 according to the invention is constructed as mentioned above. At a position upstream from the leader transport apparatus 1, a connecting device 16 for connecting the leader L and the undeveloped film F and a film feeding device 17 for feeding the undeveloped film F to the connecting device 16 are provided.

The undeveloped film F fed from the film feeding device 17 is inserted into and pass through a hole 19 bored in a rear part of the leader L and in turn is inserted in between a pair of rollers 16*a* of the connecting device 16. Further, the front end portion of the undeveloped film F fed forward by the rollers 16*a* is inserted in another hole 20 formed in the leader L and then is connected to the leader L. At positions in the vicinity of the rollers 16*a* of the connecting device 16, sensors (not shown) capable of detecting the passage or non-passage of the leader L are provided.

At a position upstream from the connecting device 16 a leader transport portion 21 for feeding the leader L is provided, and at a position under the leader transport portion 21 a leader storage-and-feed device 22 is provided.

The leader storage-and-feed device 22 is so constructed that a number of leaders L can be stored and also can be fed one by one toward the leader transport portion 21 by a leader feeding device 23, as needed.

The leader transport apparatus 1, the connecting device 16, the film feeding device 17, the leader transport portion 21 and the leader storage-and-feed device 22 are arranged in order upstream from the developing solution tanks (not shown) in the automatic developing device.

When the undeveloped film F set in the film feeding device 17 is processed, the leader L is fed from the leader storage-and-feed device 22 toward the connecting device 16 and in turn the leader transport apparatus 1 through the leader feeding device 23 and the leader transport portion 21, to connect the undeveloped film F to the leader L by the connecting device 16. And, by the transporting rollers 2 rotated by the drive of the driving unit 6 of the leader transport apparatus 1, the undeveloped film F is fed together with the leader L toward the developing solution tanks in the automatic film processing apparatus, with sandwiched between the transporting rollers 2 and the transporting rollers 4 of the movable base 5.

Now, when the automatic film processing apparatus is stopped in the middle of the transport of the film F by a power failure or a breakdown of the automatic film processing apparatus and others, the movable base 5 is opened for inspection of the condition of the film F, as shown in FIG. 2. In the case where the undeveloped film F being in the middle of transport is stopped upstream from the developing solution tanks arranged in the automatic film processing apparatus, the undeveloped film F is pulled back to the transporting path 14 in the leader transport apparatus 1 and then the movable base 5 is closed again to wait for restoration of the automatic film processing apparatus stopped by the power failure or breakdown to the normal condition. After the restoration, the driving unit 6 of the leader transport apparatus 1 is restarted to transport the leader L and undeveloped film F, which are on standby in the transporting path 14 in the leader transport apparatus 1, to the developing solution tanks, to proceed with the development processes of the undeveloped film F. When the movable base 5 is opened, the pulled back undeveloped film F may be removed together with the leader L from the transporting path 14, if necessary.

It is to be noted that if the undeveloped film F connected to the leader L is stopped in the developing solution tanks or at the discharged position from the developing solution tanks when the development process of the undeveloped film F is stopped by a power failure or the breakdown of the automatic film processing apparatus, since the development process of the undeveloped film cannot be aborted, the film should be passed through the developing solution tanks manually after an adequate time is measured and be led to the outlet side of the automatic film processing apparatus. Similarly, if the film, after developed, is stopped at a position downstream from the developing solution tanks, the developed film should also be led to the outlet side of the automatic film processing apparatus manually.

In addition, if the leader L and the undeveloped film F are poorly connected, e.g. if the connection between leader L and the undeveloped film F fails, so that only the leader L is transported, the sensors (not shown) which are provided on the fixed base 3 and the movable base 5 at their confronting surfaces or at their portions near the transporting path 14 detect the failed connection of the undeveloped film F with the leader L, to stop the drive of the leader transport apparatus 1 and others immediately and open the movable base 5 to remove the leader L from the transporting path 14 in the leader transport apparatus 1. After the removal of the leader L, the movable base 5 is closed again and the leader transport apparatus 1 and others are restarted, so that a new leader L positioned next to the removed leader and the undeveloped film F are connected by the connecting device 16 and are transported toward the developing solution tanks. Instead of this construction, another suitable construction may be employed so that an operator may visually check such a poor connection of the leader L and the undeveloped film F and stop the drive of the leader transport apparatus 1 and others urgently.

Figure 3:
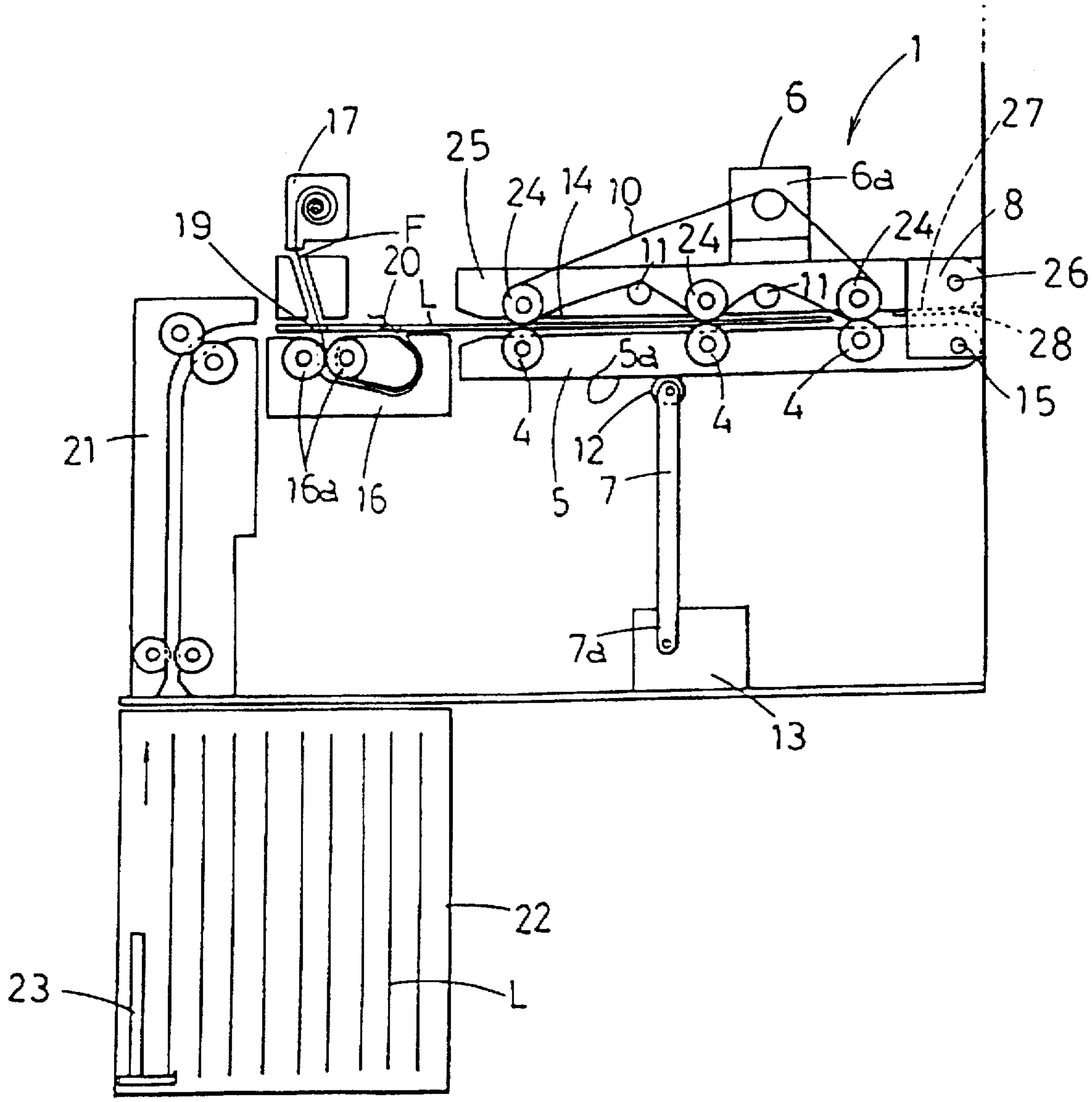
FIG. 3 diagrammatically illustrates another leader transport apparatus according to the invention.

FIG. 3 diagrammatically illustrates a leader transport apparatus 1 in the automatic film processing apparatus of a modified embodiment according to the invention. In this modified leader transport apparatus 1, a pair of movable bases 5 (25) having transporting rollers 4 (24) are so mounted on the support frame 8 that the corresponding transporting rollers 4, 24 can confront one another.

Figure 4:
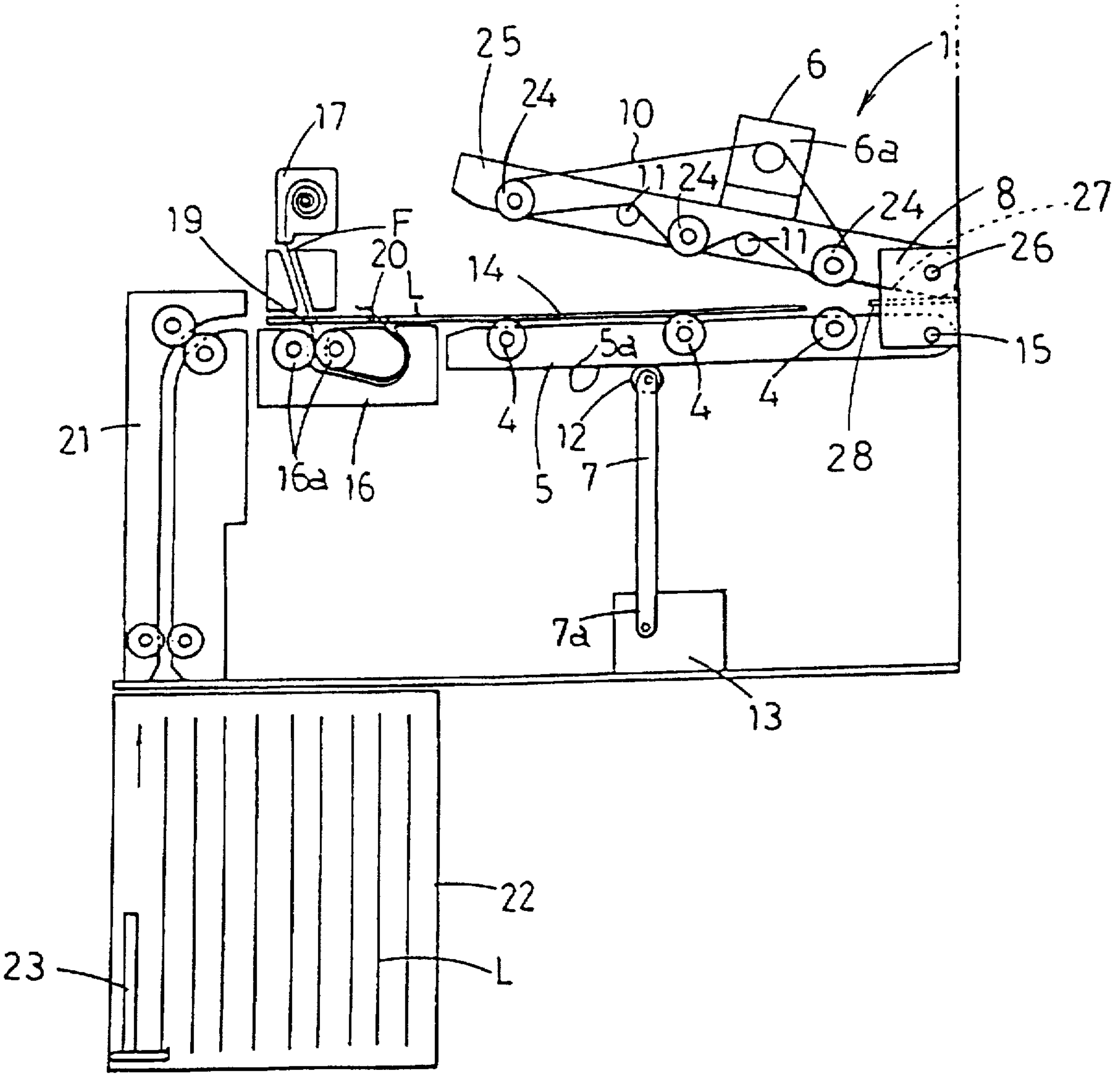
FIG. 4 illustrates the leader transport apparatus of FIG. 3 with an upper movable base opened.

Specifically, the movable base 25 is supported at one end thereof to the support frame 8 with a hinge 26, so that it is pivotable on the hinge 26 so as to be opened upward, if necessary (see FIG. 4). In addition, a horizontally extending, support plate 28 is provided on the support frame 8 so that the support plate 28 can support a lower portion 27 of the movable base 25 at the hinge 26 side thereof to hold the movable base 25 in its horizontal position. The construction of the movable base 25 itself is the same as that of the previously described fixed base 3, except for the part on the hinge 26 side. Further, the construction of another movable base 5 is also the same as that of the movable base 5 as shown in FIGS. 1 and 2, and the construction of the remaining portions or elements are also the same as those shown in FIGS. 1 and 2. Because of this, like elements are given the same reference numerals or characters but the detailed description thereon is omitted.

In the modified leader transport apparatus 1 shown in FIGS. 3 and 4, both of the movable base 5, 25 can be freely opened. Of course, an operator is given a free hand on which of the movable bases 5, 25 is to be opened.

What is claimed is:

1. A leader transport apparatus for an automatic film processing apparatus, comprising:

a fixed base having transporting rollers;

a movable base having transporting rollers and being supported at one end thereof by a hinge so that the movable base can be arbitrarily moved between an open position and a closed position, said movable base and said fixed base being disposed so that the transporting rollers of the movable base confront the transporting rollers of the fixed base when the movable base is in the closed position;

a support member for supporting a bottom surface of the movable base, said support member being movable so as to enable the movable base to move downward into the open position; and a driving unit for driving the transporting rollers of at least one of the fixed base and the movable base so that a leader and an undeveloped film can be transported while being sandwiched between the transporting rollers of the fixed base and the transporting rollers of the movable base.

2. The leader transport apparatus according to claim 1, further comprising a freely rotatable roller provided at an upper end of the support member, said freely rotatable roller being adapted to rotate in contact with the bottom surface of the movable base.

3. The leader transport apparatus according to claim 2, wherein the bottom surface of the movable base includes a recessed portion and said freely rotatable roller of the support member engages said recessed portion when the support member is in an upright position, thereby positioning the movable base in the closed position.

4. The leader transport apparatus according to claim 2, wherein a lower end the support member is pivotally mounted on a fixing member such that the support member may be tilted to enable the movable base to move downward to the open position.

5. A leader transport apparatus for an automatic film processing apparatus, comprising:

a pair of movable bases each having transporting rollers, each of the movable bases being supported at one end thereof by a hinge so as to be arbitrarily movable between an open position and a closed position, said pair of movable bases being disposed so that the transporting rollers of one of the pair of moveable bases confront the transporting rollers of the other of the pair of movable bases when both of said movable bases are in the closed position;

a support member for supporting a bottom surface of a lower one of the pair of movable bases, said support member being movable so as to enable the lower movable base to move downward into the open position; and a driving unit for driving the transporting rollers of at least one of the pair of movable bases so that a leader and an undeveloped film can be transported while being sandwiched between the transporting rollers of the pair of movable bases.

6. The leader transport apparatus according to claim 5, further comprising a freely rotatable roller provided at an upper end of the support member, said freely rotatable roller being adapted to rotate in contact with the bottom surface of the lower movable base.

7. The leader transport apparatus according to claim 6, wherein the bottom surface of the lower movable base includes a recessed portion and said freely rotatable roller of the support member engages said recessed portion when the support member is in an upright position, thereby positioning the lower movable base in the closed position.

8. The leader transport apparatus according to claim 6, wherein a lower end the support member is pivotally mounted on a fixing member such that the support member may be tilted to enable the lower movable base to move downward to the open position.

* * * * *